US010436965B2

(12) United States Patent
Kaneuchi

(10) Patent No.: US 10,436,965 B2
(45) Date of Patent: Oct. 8, 2019

(54) APPARATUS AND METHOD FOR MANUFACTURING OPTICAL FIBER HAVING BENT PORTION

(71) Applicant: SUMITOMO ELECTRIC INDUSTRIES, LTD., Osaka-shi, Osaka (JP)

(72) Inventor: Yasuomi Kaneuchi, Osaka (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 16/121,983

(22) Filed: Sep. 5, 2018

(65) Prior Publication Data

US 2019/0072705 A1    Mar. 7, 2019

(30) Foreign Application Priority Data

Sep. 6, 2017 (JP) .................. 2017-171323

(51) Int. Cl.
| | |
|---|---|
| F21V 8/00 | (2006.01) |
| G02B 6/02 | (2006.01) |
| G02B 6/38 | (2006.01) |
| G02B 6/42 | (2006.01) |
| G02B 6/255 | (2006.01) |

(52) U.S. Cl.
CPC .......... *G02B 6/0005* (2013.01); *G02B 6/021* (2013.01); *G02B 6/02395* (2013.01); *G02B 6/2552* (2013.01); *G02B 6/3873* (2013.01); *G02B 6/424* (2013.01); *G02B 6/4249* (2013.01); *G02B 6/4214* (2013.01)

(58) Field of Classification Search
CPC .. G02B 6/0005; G02B 6/021; G02B 6/02395; G02B 6/3873; G02B 6/424; G02B 6/4249; G02B 6/2552
See application file for complete search history.

(56) References Cited

U.S. PATENT DOCUMENTS

| | | | | |
|---|---|---|---|---|
| 4,073,859 A | * | 2/1978 | Baumgartner | ........ C01B 33/035 |
| | | | | 264/295 |
| 2011/0198765 A1 | | 8/2011 | Sasaki | |

FOREIGN PATENT DOCUMENTS

WO    WO-2010/044273 A1    4/2010

\* cited by examiner

*Primary Examiner* — Thomas M Sember
(74) *Attorney, Agent, or Firm* — Drinker Biddle & Reath LLP

(57) ABSTRACT

An optical fiber manufacturing apparatus includes a rotating mechanism including a holding member that holds one side of an optical fiber and a rotating member that rotates the holding member, the optical fiber including a glass fiber portion and a coating layer covering the glass fiber portion; a guiding member secured at a distance from the rotating mechanism and configured to retain the other side of the optical fiber loosely fitted therein; and a heating mechanism configured to heat a part of the glass fiber portion exposed and extending out of the coating layer, the part being interposed between the holding member and the guiding member. By rotating the rotating member counterclockwise by a given angle, the glass fiber portion is drawn from the guiding member and bent with a predetermined curvature while being heated.

7 Claims, 7 Drawing Sheets

APPARATUS AND METHOD FOR MANUFACTURING OPTICAL FIBER HAVING BENT PORTION

BACKGROUND OF THE INVENTION

Field of the Invention

The present invention relates to an apparatus and method for manufacturing an optical fiber having a bent portion.

Description of the Related Art

Optical modules are getting smaller in size. Accordingly, when an optical fiber is vertically connected at one end thereof to a substrate having an optical element (e.g., light emitting element, light receiving element, or optical circuit) mounted thereon, with the one end facing the substrate, it is required to reduce the profile (height) of the optical fiber above the substrate. To make the profile lower, the optical fiber needs to be bent in a small radius in the vicinity of its end portion. For example, WO 2010/044273 discloses an optical fiber shaping apparatus. When bending an optical fiber using a moving unit and a non-contact heating unit, the optical fiber shaping apparatus uses a rotating jig having an adjustable angular velocity to bend the optical fiber.

SUMMARY OF THE INVENTION

An object of the present invention is to provide an apparatus and method for manufacturing a bent optical fiber using a simple configuration and technique.

(1) An apparatus for manufacturing an optical fiber having a bent portion, according to an embodiment of the present invention, includes a rotating mechanism including a holding member that holds one side of an optical fiber and a rotating member that rotates the holding member, the optical fiber including a glass fiber portion and a coating layer covering the glass fiber portion; a guiding member secured at a distance from the rotating mechanism and configured to retain the other side of the optical fiber loosely fitted therein; and a heating mechanism configured to heat a part of the glass fiber portion exposed and extending out of the coating layer, the part being interposed between the holding member and the guiding member.

In the apparatus described above, (2) the holding member may hold the glass fiber portion, with the coating layer therebetween, and the guiding member may allow the glass fiber portion exposed and extending out of the coating layer to be loosely fitted therein. In the apparatus described above, (3) the guiding member may include a V-grooved substrate and a flat substrate that are made of glass. In the apparatus described above, (4) the guiding member may be formed by a glass capillary member having a capillary therein. In the apparatus described above, (5) the optical fiber may be an optical fiber ribbon formed by combining together a plurality of glass fiber portions arranged in parallel.

(6) A method for manufacturing an optical fiber having a bent portion, according to another embodiment of the present invention, includes an attaching step of holding one side of an optical fiber using a holding member of a rotating mechanism, the optical fiber including a glass fiber portion and a coating layer covering the glass fiber portion, and retaining the other side of the optical fiber loosely fitted in a guiding member secured at a distance from the rotating mechanism; a bending step of forming a bent portion in the glass fiber portion by rotating the rotating mechanism in a direction in which the holding member is moved away from the guiding member and applying stress to the glass fiber portion exposed and extending out of the coating layer; and a heating step of heating the bent portion to release the stress from the bent portion.

In the method described above, (7) the attaching step may include holding the glass fiber portion using the holding member, with the coating layer between the holding member and the glass fiber portion, and allowing the glass fiber portion exposed and extending out of the coating layer to be loosely fitted in the guiding member, and the method may further include, after the heating step, a guiding member securing step of securing the guiding member to the glass fiber portion, with the bent portion interposed therebetween; a cutting step of cutting off an end of the glass fiber portion, the end protruding from the guiding member in a direction away from the coating layer; and a grinding step of grinding an end face of the glass fiber portion and the guiding member, the end face being on a side where the end of the glass fiber portion has been cut off.

In the apparatus and method according to the embodiments described above, the optical fiber is held by the holding member of the rotating mechanism. This means that by simply rotating the holding member, the optical fiber can be drawn from the guiding member and there is no need to add any device that feeds the optical fiber in the longitudinal direction of the optical fiber. With this simple configuration having the rotating mechanism alone, the apparatus can manufacture a bent optical fiber.

DESCRIPTION OF THE PREFERRED EMBODIMENTS

Figure 1A:
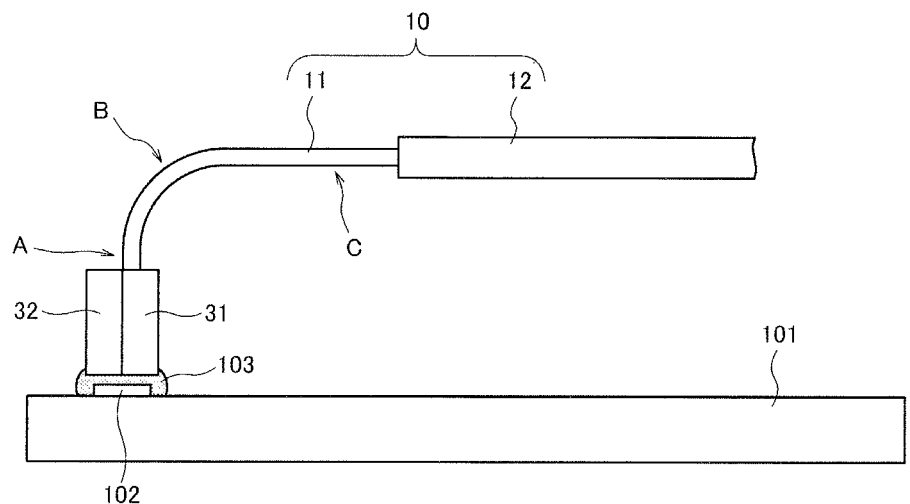
FIG. 1A is a lateral view illustrating how an optical fiber with a bent portion, manufactured by a manufacturing apparatus and a manufacturing method according to embodiments of the present invention, is mounted on an optical-element mounting substrate, as viewed from a direction parallel to the substrate plane.

An apparatus and method for manufacturing an optical fiber having a bent portion according to embodiments of the present invention will now be described in detail with reference to the drawings. Note that the present invention is not limited to the embodiments described herein and is defined by the appended claims. All changes that fall within meanings and scopes equivalent to the claims are therefore intended to be embraced by the claims. As long as combination of a plurality of embodiments is possible, the present invention includes combinations of any of the embodiments described herein. In the following description, components denoted by the same reference numerals are considered the same, even when appearing in different drawings, and their description may be omitted.

The apparatus disclosed in WO 2010/044273 has a complex structure, because when bending an optical fiber, the apparatus requires at least a moving unit that moves the optical fiber in the longitudinal direction of the optical fiber. Additionally, when the apparatus uses a rotating jig, it is difficult to accurately synchronize the conveyance speed of the moving unit with the rotating speed of the rotating jig. Due to differences in control accuracy among components, tension may be intermittently applied to the optical fiber. This may cause part of the bent portion of the optical fiber to undesirably elongate.

Figure 1B:
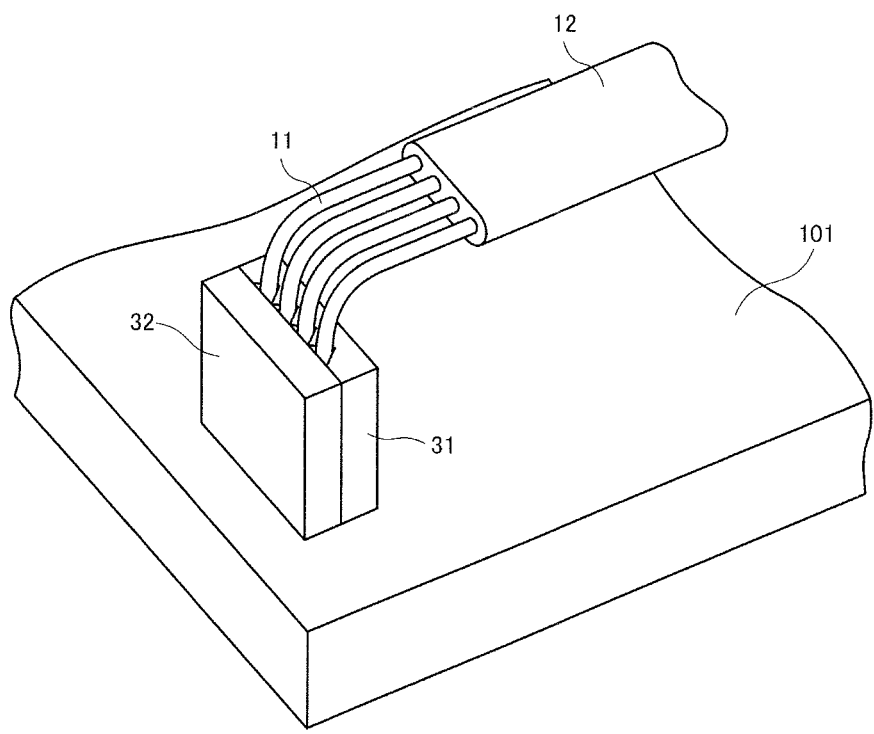
FIG. 1B is a perspective view of the same.

FIG. 1A is a lateral view illustrating how an optical fiber with a bent portion, manufactured by a manufacturing apparatus and a manufacturing method according to embodiments of the present invention, is mounted on an optical-element mounting substrate, as viewed from a direction parallel to the substrate surface, and FIG. 1B is a perspective view of the same, as viewed at an angle from above the substrate surface. An optical fiber 10 includes a plurality of glass fiber portions 11, each including a silica glass core and a clad having a refractive index lower than that of the core, and a resin coating layer 12 covering the glass fiber portions 11. In FIGS. 1A and 1B, four glass fiber portions 11 arranged in parallel are combined together by one coating layer 12 to form an optical fiber ribbon (optical fiber 10). The number of the glass fiber portions 11 does not necessarily need to be four, and may be one or any greater number. The optical fiber 10 does not necessarily need to be in the form of a ribbon. When the optical fiber 10 is not in the form of a ribbon, the glass fiber portions 11 included in the optical fiber 10 are each provided with the resin coating layer 12. The glass fiber portions 11 may be of a single-core type or multi-core type.

The glass fiber portions 11 of the optical fiber 10 are secured on one side thereof by a connection component which includes, for example, a V-grooved substrate 31 and a flat substrate 32 (described below), and are disposed in such a manner as to face an optical element 102 formed by a light emitting element or a light receiving element mounted on an optical-element mounting substrate 101. An end portion of the connection component by which the glass fiber portions 11 are secured is ground together with the glass fiber portions 11 and bonded, for example, with a glass adhesive 103 to the optical-element mounting substrate 101. In the present invention, the term "optical fiber" refers to one that includes at least one glass fiber portion and a coating layer therearound. The coating layer of the optical fiber may be partly removed to allow the glass fiber portion to be exposed.

The optical fiber 10 has a first non-bent portion A secured to the connection component, a bent portion B, and a second non-bent portion C disposed opposite the first non-bent portion A, with the bent portion B interposed therebetween. The second non-bent portion C is disposed substantially parallel to the optical-element mounting substrate 101, and this makes the profile of the optical fiber 10 lower. To form the bent portion B of the optical fiber 10, the glass fiber portions 11 exposed by removing the coating layer 12 from the optical fiber 10 are subjected to bending (as described below). After being bent, the glass fiber portions 11 may be coated with protective resin (not shown). An optical connector (not shown) is connected to an end of the second non-bent portion C.

Figure 2A:
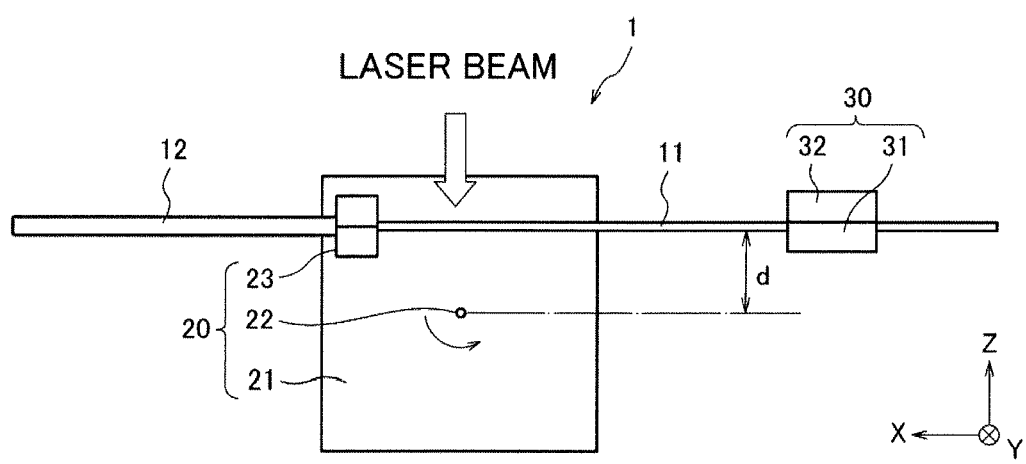
FIG. 2A is a lateral view illustrating how the optical fiber is attached to the manufacturing apparatus according to the embodiment of the present invention.
Figure 2B:
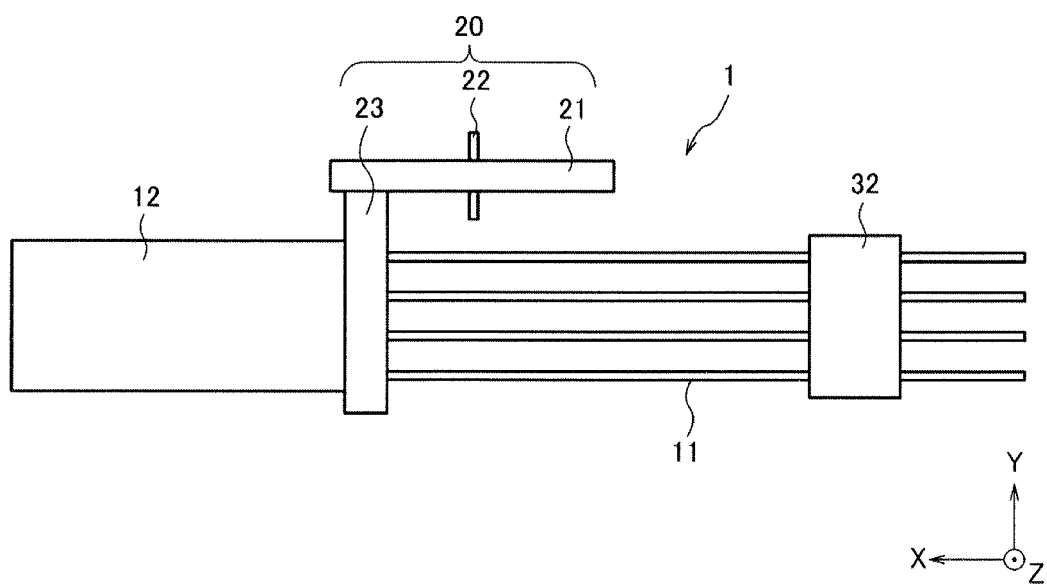
FIG. 2B is a plan view of the same.

FIG. 2A is a lateral view illustrating how the optical fiber 10 is attached to a manufacturing apparatus 1 for manufacturing an optical fiber having a bent portion according to the embodiment of the present invention, and FIG. 2B is a plan view of the same. The manufacturing apparatus 1 includes a rotating mechanism 20, a guiding member 30, and a light source (not shown). The rotating mechanism 20 includes a rotating member 21 rotating about a rotating shaft 22, and a holding member 23 secured to the rotating member 21. In the following description, the rotating shaft 22 is described as corresponding to the Y-axis, a horizontal direction perpendicular to the Y-axis is described as corresponding to the X-axis, and a vertical direction perpendicular to the Y-axis is described as corresponding to the Z-axis. The guiding member 30 is secured at a predetermined distance from the rotating mechanism 20. The light source, which corresponds to a heating mechanism of the present invention, is disposed substantially directly above the rotating shaft 22 (in the Z-axis direction) and emits a laser beam that heats a region of the glass fiber portions 11 corresponding to the bent portion B. Although the light source that emits a laser beam is used as the heating mechanism in the present embodiment, a burner, arc discharge, or a heater may be used as the heating mechanism.

Various clamping mechanisms may be used as the holding member 23. The holding member 23 is displaced by a given distance from the rotating shaft 22 in the X-axis direction and Z-axis direction. To prevent the glass fiber portions 11 from being damaged, the holding member 23 preferably holds the glass fiber portions 11, with the coating layer 12 of the optical fiber 10 therebetween, but the holding member 23 may directly hold the glass fiber portions 11. The glass fiber portions 11 may be entirely coated with the coating layer 12, except the region where the bent portion B is to be formed.

Figure 3:
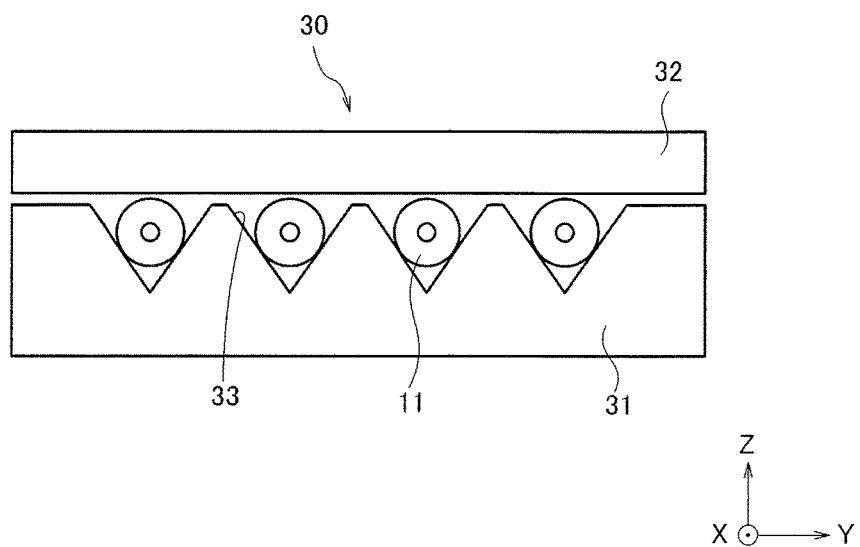
FIG. 3 is a front view of a guiding member used in the manufacturing apparatus illustrated in FIGS. 2A and 2B.

FIG. 3 is a front view of an example of the guiding member 30 used in the manufacturing apparatus 1. The guiding member 30 is a component for aligning the glass fiber portions 11. In the present embodiment, the guiding member 30 includes the V-grooved substrate 31 made of glass and the flat substrate 32 also made of glass.

The V-grooved substrate 31 is detachably secured at a predetermined distance from the rotating member 21, with the opening side of four V-grooves 33 thereof facing upward (in the positive direction of the Z-axis in FIG. 3). The four V-grooves 33 of the V-grooved substrate 31 extending along the X-axis direction are arranged side by side in the Y-axis direction in FIG. 3. The V-grooves 33 are each sized to accommodate one glass fiber portion 11 thereon. The flat substrate 32 is formed, for example, in a planar shape. The flat substrate 32 is secured above the glass fiber portions 11 in the Z-axis direction, with clearance therebetween, in such a manner as to allow the glass fiber portions 11 to move in the X-axis direction. That is, the glass fiber portions 11 are loosely fitted in, and guided by, the guiding member 30 in such a manner as to be movable in the X-axis direction.

In the present embodiment, the guiding member 30, which serves as a guiding member during creation of the bent portion B, can be used as a connection component for connecting the optical fiber 10 to the optical-element mounting substrate 101 after creation of the bent portion B in the optical fiber 10. The optical fiber 10 is therefore loosely fitted in, and guided by, the guiding member 30 in a region where the glass fiber portions 11 are not coated with the coating layer 12. If the guiding member 30 is not used as a connection component for connecting the optical fiber 10 to the optical-element mounting substrate 101, the glass fiber portions 11 coated with the coating layer 12 may be loosely fitted in, and guided by, the guiding member 30.

When the rotating member 21 is at an initial position, a line connecting the holding member 23 to the guiding member 30 extends substantially in the horizontal direction (parallel to the X-axis). Therefore, the glass fiber portions 11 supported by the holding member 23 and the guiding member 30 are retained substantially horizontally, except a negligible bend formed by their own weight. The rotating shaft 22 and the glass fiber portions 11 are spaced apart by a distance d. The distance d is adjusted in accordance with the curvature of the bent portion B formed in the glass fiber portions 11. The bent portion B with smaller curvature is formed when the distance d is long, and the bent portion B with larger curvature is formed when the distance d is small.

Figure 4:
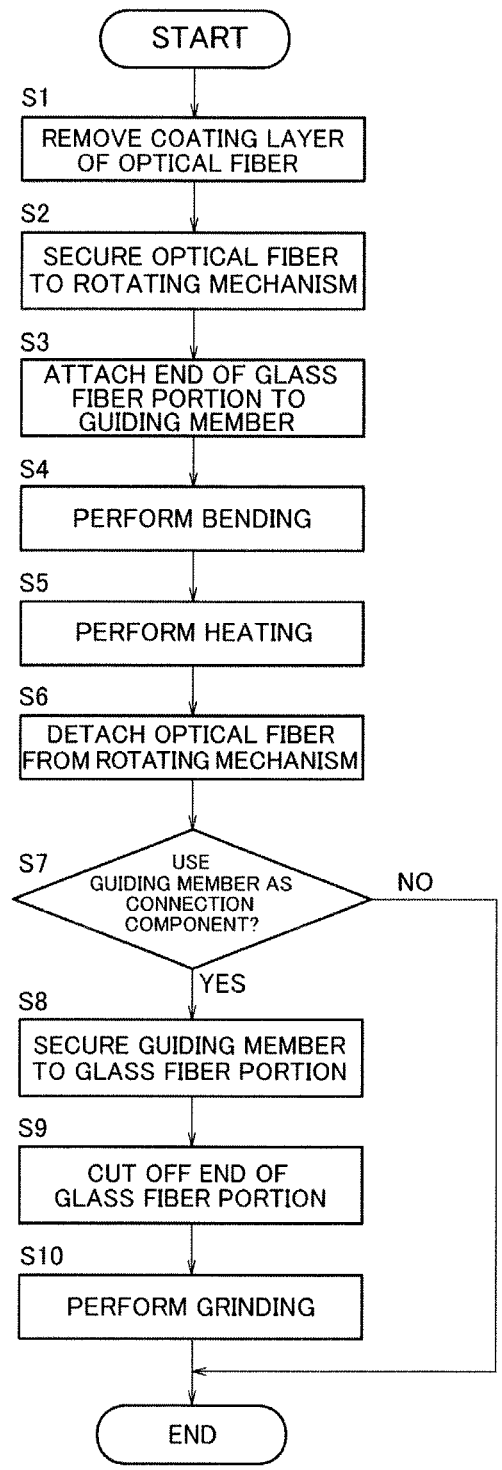
FIG. 4 is a flowchart illustrating the manufacturing method according to the embodiment of the present invention.

FIG. 4 is a flowchart illustrating a method for manufacturing an optical fiber having a bent portion according to an embodiment of the present invention. First, the coating layer 12 of the optical fiber 10 is removed in a region where the bent portion B is to be formed (step S1). In the present embodiment, the coating layer 12 is removed in a region corresponding to the bent portion B and the first non-bent portion A of the optical fiber 10. As described above, the optical fiber 10 may include either one or more glass fiber portions 11, and does not necessarily need to be in the form of a ribbon.

Next, the optical fiber 10 is placed in the manufacturing apparatus 1. In the present embodiment, the optical fiber 10 is secured to the holding member 23 of the rotating mechanism 20 on a side of the second non-bent portion C adjacent to the bent portion B (step S2). In the present embodiment, the bending start position is a start position of the bent portion B adjacent to the side where the connector is connected and opposite the side where the optical fiber 10 faces the optical-element mounting substrate 101. The holding member 23 holds the optical fiber 10 in such a manner that the optical fiber 10 is irradiated with a laser beam at this bending start position. As illustrated in FIG. 2A, a laser beam is emitted from above the rotating shaft 22. Since the holding member 23 is displaced from the rotating shaft 22 in the X-axis direction and the Z-axis direction, the holding member 23 is prevented from being irradiated with the laser beam. The holding member 23 can thus hold a region of the glass fiber portions 11 coated with the coating layer 12. If the glass fiber portions 11 are not coated with the coating layer 12, the glass fiber portions 11 may be aligned and held together by the holding member 23. When the optical fiber 10 is an optical fiber ribbon, the holding member 23 can simply hold the glass fiber portions 11 together, with the coating layer 12 therebetween.

Next, the glass fiber portions 11 are loosely fitted into the guiding member 30 on one side thereof (at the first non-bent portion A) (step S3). The glass fiber portions 11 are thus linearly arranged. The step of securing the optical fiber 10 to the holding member 23 (step S2) and the step of fitting the glass fiber portions 11 into the guiding member 30 (step S3) may be performed in reverse order.

Figure 5:
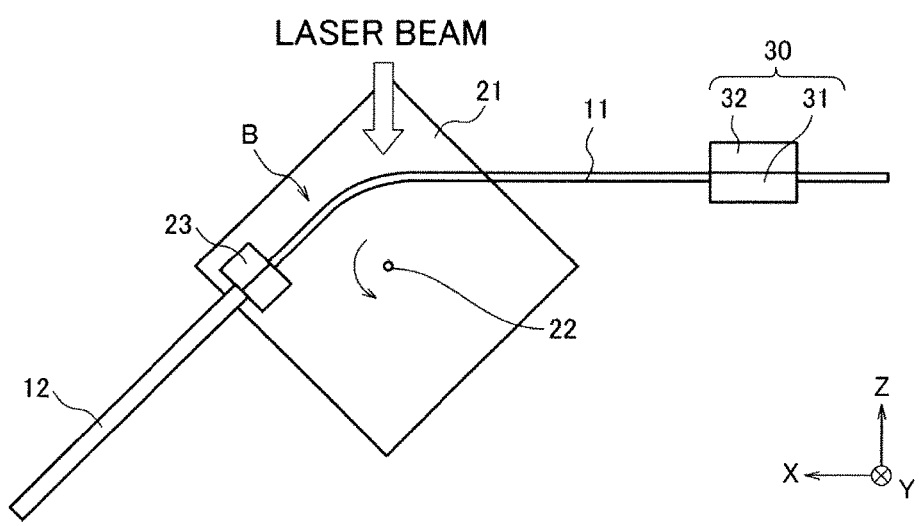
FIG. 5 is a conceptual diagram illustrating a rotated state of the manufacturing apparatus illustrated in FIGS. 2A and 2B.
Figure 6:
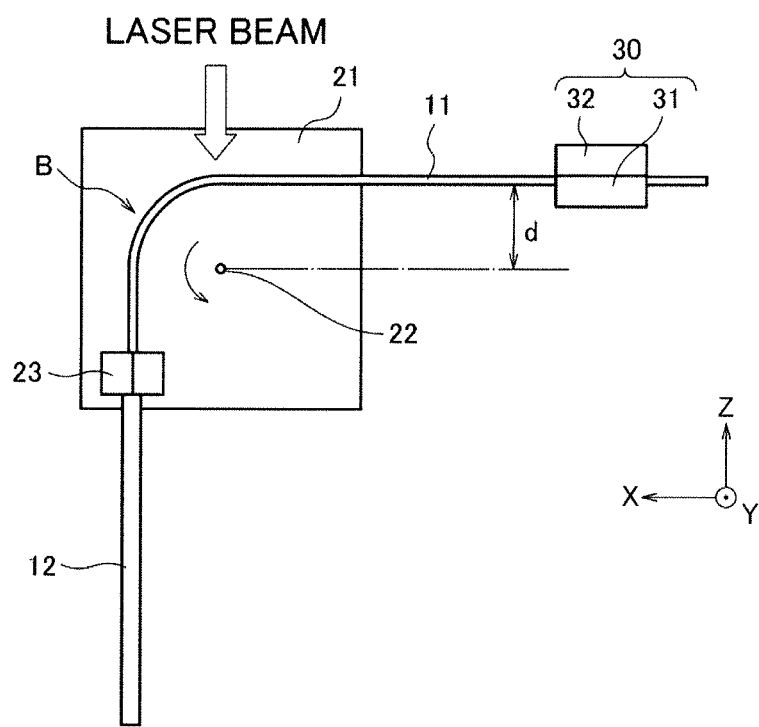
FIG. 6 is a conceptual diagram illustrating a more rotated state of the manufacturing apparatus illustrated in FIGS. 2A and 2B.

FIGS. 5 and 6 are conceptual diagrams illustrating how the manufacturing apparatus 1 is rotated. Bending is performed which involves rotating the rotating member 21 counterclockwise by a given angle to bend the glass fiber portions 11 with a predetermined curvature (step S4), and heating is performed which involves applying heat to the bent portion of the glass fiber portions 11 (step S5). Internal stress produced in the glass fiber portions 11 by the bending is released by the heating.

By rotating the rotating member 21, the glass fiber portions 11 held by the holding member 23 are pulled in the X-axis direction. Since the glass fiber portions 11 are loosely fitted in the guiding member 30 on one side thereof (at the first non-bent portion A), no tensile stress is applied to the bent portion B of the optical fiber 10. To evenly apply heat to the glass fiber portions 11 arranged in parallel, it is preferable that the glass fiber portions 11 be scanned with a laser beam in the direction in which the glass fiber portions 11 are arranged.

The bending (step S4) and the heating (step S5) may each be performed at a time. To achieve a desired degree of bending, however, it is preferable to perform each of them in multiple steps while shifting the bending position little by little. When the bending angle of the bent portion B reaches a desired angle as illustrated in FIG. 6, the optical fiber 10 is cooled and detached from the rotating mechanism 20 (step S6).

Figure 7:
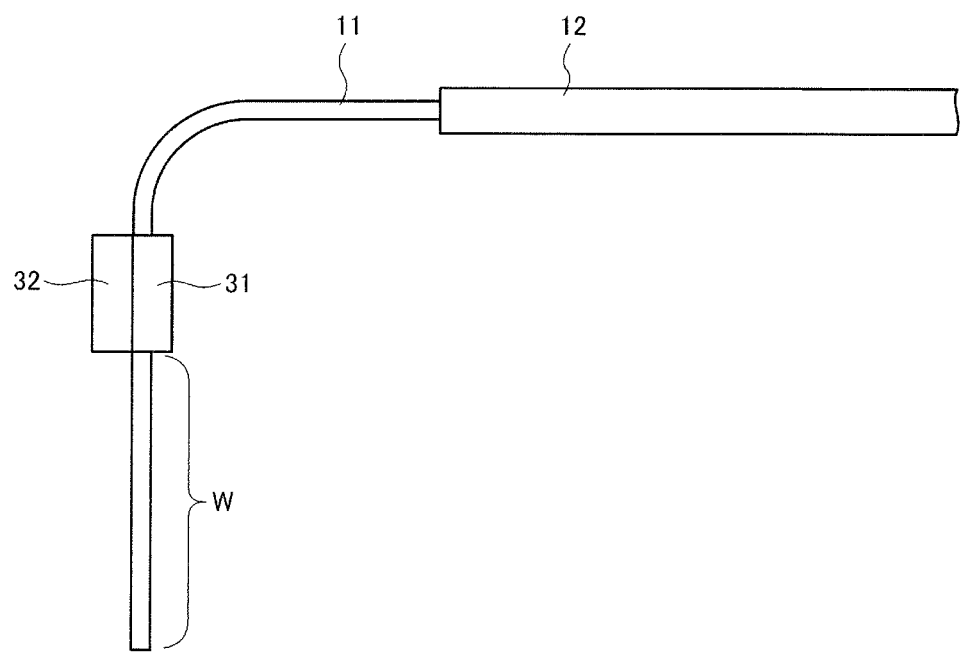
FIG. 7 is a conceptual diagram illustrating an optical fiber having a bent portion manufactured by the manufacturing apparatus and the manufacturing method according to the embodiments of the present invention.

FIG. 7 is a conceptual diagram illustrating an optical fiber having a bent portion, manufactured by the manufacturing apparatus 1 illustrated in FIGS. 2A and 2B. If the guiding member 30 is used as a connection component for connecting the optical fiber to a substrate (YES in step S7), the guiding member 30 is taken out together with the optical fiber 10 when the optical fiber 10 is detached from the rotating mechanism 20. After the distance from one end of the guiding member 30 to the bent portion B is adjusted and the guiding member 30 is appropriately positioned, the guiding member 30 is secured to the glass fiber portions 11, for example, with a glass adhesive (step S8). Next, a part W of the glass fiber portions 11 protruding from the guiding member 30 is cut off (step S9). Then, on the side where the part W of the glass fiber portions 11 has been cut off, the end face of the guiding member 30 and the glass fiber portions 11 is ground (step S10). The optical fiber 10 having a connection component attached thereto, as illustrated in FIG. 1, is thus obtained.

Figure 8:
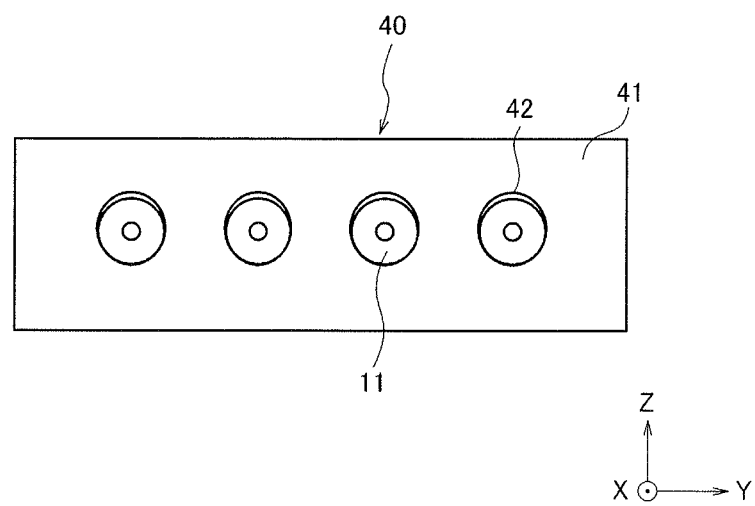
FIG. 8 is a front view of another guiding member that can be used in the manufacturing method according to the embodiment of the present invention.

FIG. 8 is a front view of another guiding member 40 that can be used in the manufacturing method according to the embodiment of the present invention. The guiding member 40 is formed by a glass capillary member 41 having capillaries 42 therein. The inside diameter of the capillaries 42 is greater than the outside diameter of the glass fiber portions 11. When inserted into the capillaries 42, the glass fiber portions 11 are positioned in such a manner as to be loosely fitted therein and movable back and forth. After the bent portion is created in the optical fiber, the guiding member 40 can be used as a connection component for connecting the optical fiber to the substrate. When the guiding member 40 is used as a connection component for connecting the optical fiber to the substrate, the clearance between the capillary member 41 and the glass fiber portion 11 in each capillary 42 is filled with a glass adhesive by capillary action, so that the capillary member 41 and the glass fiber portions 11 are secured together.

In the embodiments described above, the guiding member 30 or 40 of the manufacturing apparatus for bending an optical fiber is used as a connection component for connecting the optical fiber to the substrate. When not used as a connection component for connecting the optical fiber to the substrate, the guiding members 30 and 40 do not necessarily need to be made of glass, because there is no need to adjust the thermal expansion coefficient of the guiding members 30 and 40 to that of the glass fiber portions 11. As an alternative to the holding member 23 of the rotating member 21, the optical connector connected to one end of the optical fiber 10 may be used.

What is claimed is:

1. An apparatus for manufacturing an optical fiber having a bent portion, the apparatus comprising:
    a rotating mechanism including a holding member that holds one side of an optical fiber and a rotating member that rotates the holding member, the optical fiber including a glass fiber portion and a coating layer covering the glass fiber portion, the holding member having a clamping mechanism that holds the one side of the optical fiber;
    a guiding member secured at a distance from the rotating mechanism and configured to retain the other side of the optical fiber loosely fitted therein, the guiding member having a free space to loosely fit and guide the optical fiber, and said free space is maintained when the guiding member guides the optical fiber; and
    a heating mechanism configured to heat a part of the glass fiber portion exposed and extending out of the coating layer, the part being interposed between the holding member and the guiding member.

2. The apparatus according to claim 1, wherein the holding member holds the glass fiber portion, with the coating layer therebetween, and the guiding member allows the glass fiber portion exposed and extending out of the coating layer to be loosely fitted therein.

3. The apparatus according to claim 1, wherein the guiding member includes a V-grooved substrate and a flat substrate that are made of glass.

4. The apparatus according to claim 1, wherein the guiding member is formed by a glass capillary member having a capillary therein.

5. The apparatus according to claim 1, wherein the optical fiber is an optical fiber ribbon formed by combining together a plurality of glass fiber portions arranged in parallel.

6. A method for manufacturing an optical fiber having a bent portion, the method comprising:
    an attaching step of holding one side of an optical fiber using a holding member of a rotating mechanism, the one side of the optical fiber being held in a clamping mechanism of the holding member, the optical fiber including a glass fiber portion and a coating layer covering the glass fiber portion, and retaining the other side of the optical fiber loosely fitted in a guiding member secured at a distance from the rotating mechanism, the other side of the optical fiber being loosely fitted in the guiding member such that a free space of the guiding member is maintained;
    a bending step of forming a bent portion in the glass fiber portion by rotating the rotating mechanism in a direction in which the holding member is moved away from the guiding member and applying stress to the glass fiber portion exposed and extending out of the coating layer; and
    a heating step of heating the bent portion to release the stress from the bent portion.

7. The method according to claim 6, wherein
the attaching step includes holding the glass fiber portion using the holding member, with the coating layer between the holding member and the glass fiber portion, and allowing the glass fiber portion exposed and extending out of the coating layer to be loosely fitted in the guiding member,
the method further comprising:
after the heating step, a guiding member securing step of securing the guiding member to the glass fiber portion, with the bent portion interposed therebetween;
a cutting step of cutting off an end of the glass fiber portion, the end protruding from the guiding member in a direction away from the coating layer; and
a grinding step of grinding an end face of the glass fiber portion and the guiding member, the end face being on a side where the end of the glass fiber portion has been cut off.

* * * * *